(12) United States Patent
Aboutalib

(10) Patent No.: US 7,558,772 B2
(45) Date of Patent: Jul. 7, 2009

(54) INFORMATION FUSION PREDICTOR

(75) Inventor: Omar Aboutalib, Diamond Bar, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/297,145

(22) Filed: Dec. 8, 2005

(65) Prior Publication Data

US 2007/0136224 A1 Jun. 14, 2007

(51) Int. Cl.
*G06N 5/00* (2006.01)
(52) U.S. Cl. .......................................... 706/52; 706/45
(58) Field of Classification Search .................. 706/15, 706/16, 45, 52
See application file for complete search history.

(56) References Cited

U.S. PATENT DOCUMENTS

| | | | | |
|---|---|---|---|---|
| 5,748,851 A * | 5/1998 | Iokibe et al. ................... 706/58 |
| 5,926,804 A * | 7/1999 | Tufts et al. ..................... 706/25 |
| 5,963,653 A | 10/1999 | McNary et al. |
| 6,272,242 B1 * | 8/2001 | Saitoh et al. ................. 382/187 |
| 6,393,137 B1 | 5/2002 | Chen et al. |
| 6,546,378 B1 * | 4/2003 | Cook .......................... 706/12 |
| 6,650,779 B2 | 11/2003 | Vachtesvanos et al. |
| 6,731,990 B1 * | 5/2004 | Carter et al. ................... 700/52 |
| 6,754,390 B2 | 6/2004 | Dobeck |
| 6,757,668 B1 * | 6/2004 | Goebel et al. ................. 706/59 |
| 6,782,375 B2 * | 8/2004 | Abdel-Moneim et al. ..... 706/46 |
| 6,801,662 B1 | 10/2004 | Owechko et al. |
| 6,944,566 B2 * | 9/2005 | Chen et al. ................... 702/116 |
| 6,950,555 B2 * | 9/2005 | Filatov et al. ................ 382/229 |
| 7,050,950 B2 * | 5/2006 | Goebel .......................... 703/2 |
| 7,287,013 B2 * | 10/2007 | Schneider et al. ............. 706/15 |
| 2002/0138455 A1 * | 9/2002 | Abdel-Moneim et al. ..... 706/15 |
| 2002/0164070 A1 * | 11/2002 | Kuhner et al. ................ 382/159 |
| 2003/0123737 A1 | 7/2003 | Mojsilovic et al. |
| 2003/0149675 A1 * | 8/2003 | Ansari et al. .................... 706/2 |
| 2003/0158827 A1 * | 8/2003 | Ansari et al. ................... 706/12 |
| 2003/0169906 A1 | 9/2003 | Gokturk et al. |
| 2003/0186663 A1 * | 10/2003 | Chen et al. ................. 455/226.3 |
| 2004/0172374 A1 * | 9/2004 | Forman ......................... 706/12 |
| 2004/0186815 A1 | 9/2004 | Stockfisch |
| 2005/0256820 A1 * | 11/2005 | Dugan et al. ................... 706/52 |
| 2006/0230006 A1 * | 10/2006 | Buscema ...................... 706/13 |

OTHER PUBLICATIONS

H. Wu et al., "Sensor Fusion Using Dempster-Shafer Theory", *IEEE Instrumentation and Measurement Technology Conference*, Anchorage, AK, May 21-23, 2002, 6 pgs.
S. Le Hégarat-Mascle et al., "Multi-Scale Data Fusion Using Dempster-Shafer Evidence Theory", *Integrated Computer-Aided Engineering*, No. 10, 2003, pp. 9-22.

* cited by examiner

*Primary Examiner*—Wilbert L Starks, Jr.
(74) *Attorney, Agent, or Firm*—Robert P. Lenart, Esq.; Pietragallo Gordon Alfano Bosick & Raspanti, LLP

(57) ABSTRACT

A method of data fusion comprises the steps of: receiving a plurality of decisions and associated confidences; determining probabilities of a set of the decisions; if the probabilities are not zero, then choosing the decision having a highest likelihood from the plurality of decisions; and if the probabilities are zero, then selecting an algorithm to be used for choosing one of the decisions.

18 Claims, 4 Drawing Sheets

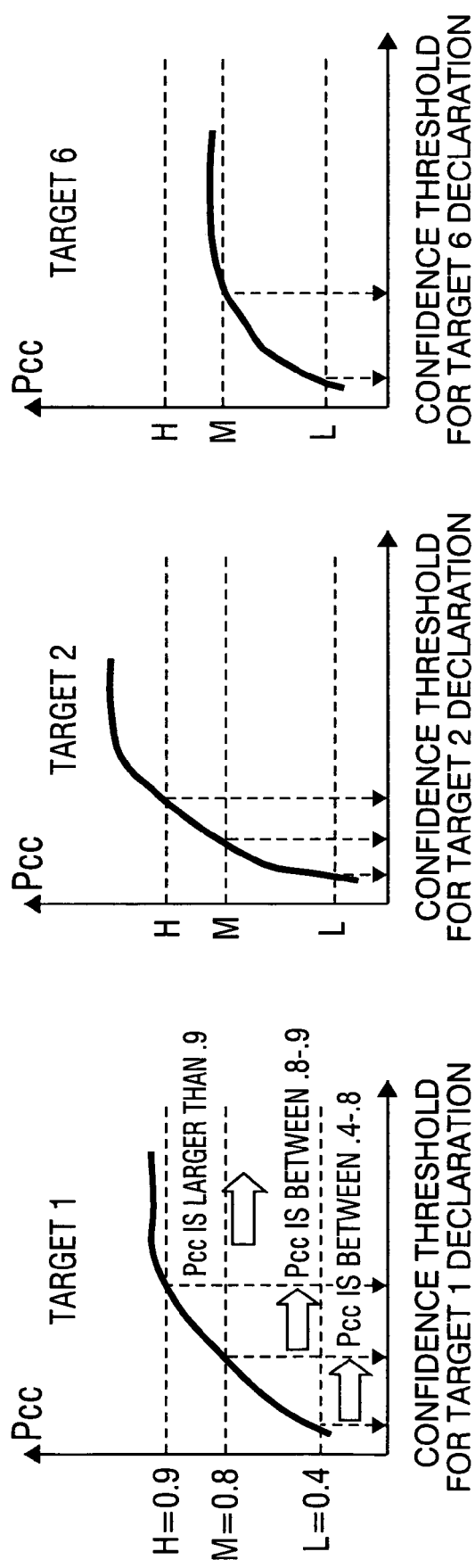

INFORMATION FUSION PREDICTOR

FIELD OF THE INVENTION

This invention relates to methods and systems for feature extraction and object classification. More specifically, the invention relates to the fusing of information from multiple sources.

BACKGROUND OF THE INVENTION

Reconnaissance, surveillance and target acquisition systems can include a plurality of airborne platforms or air vehicles, each carrying a plurality of sensors that are used to collect information about an area and/or target of interest. The airborne platforms can communicate with requesters, which can include persons or equipment that desire access to data collected by the sensors. This network centric environment is critical to share awareness, enhance collaboration among various forces, and expand understanding of the battlefield conditions.

In some instances, a plurality of sensors can be used to collect information about an area and/or target of interest. The information produced by these sensors can be combined to enhance the accuracy of decisions or estimates based on the information. Conflicting decisions made by multiple sensors on the same platform or within the network may confuse the participants.

Industry standards for decision level fusion such as Dempster-Shafer have limited optimization space potentially yielding unreliable fused decisions. Other decision level fusion systems use heuristic rules that are application specific and are not easily generalized.

There is a critical need for a decision level fusion process that maximizes the synergy among decision sources to reduce target ambiguity, produce timely and accurate decisions, and reduce fratricide and operator workload.

SUMMARY OF THE INVENTION

This invention provides a method of data fusion comprising the steps of: receiving a plurality of decisions and associated confidences; determining probabilities of a set of the decisions; if the probabilities are not zero, then choosing the decision having a highest likelihood from the plurality of decisions; and if the probabilities are zero, then selecting an algorithm to be used for choosing one of the decisions.

BRIEF DESCRIPTION OF THE DRAWINGS

FIGS. 4, 5 and 6 illustrate confidence level mapping to the probability of correct classification.

DETAILED DESCRIPTION OF THE INVENTION

Figure 1:
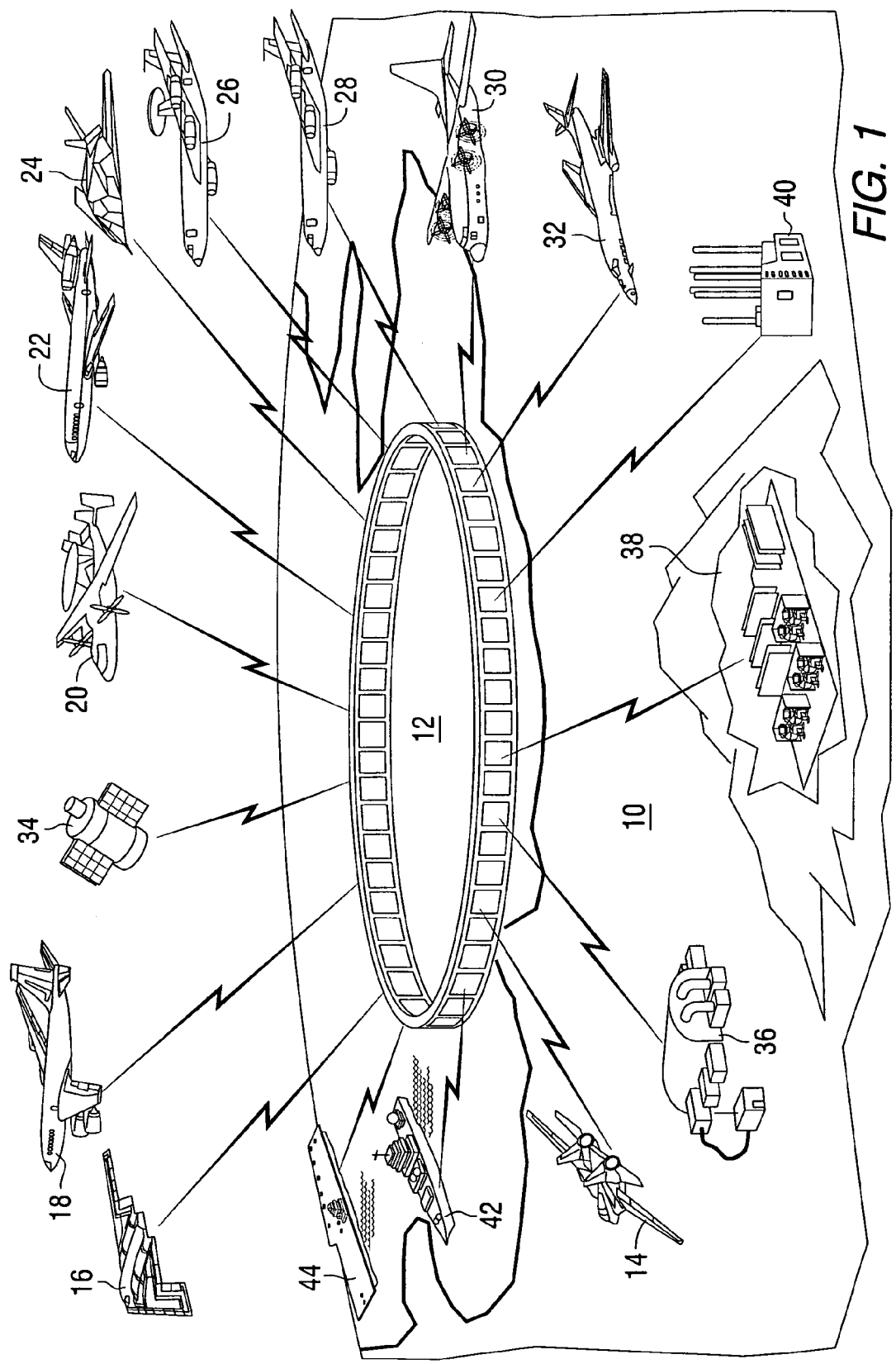
FIG. 1 depicts a network centric environment where an effective decision level fusion process is required.

Referring to the drawings, FIG. 1 depicts a network centric environment where an effective decision level fusion process is required. The system 10 in this example includes a plurality of information sources that supply information to a command center 12 (or central processing center) that includes equipment for processing information received from the sources.

The information sources (also referred to as classifiers), can be for example, air vehicles 14, 16, 18, 20, 22, 24, 26, 28, 30 and 32 (which can be manned or unmanned); satellites 34, ground vehicles or installations 36, 38, and 40; and/or ships 42 and 44. The information sources can include one or more sensors for supplying information about an area and/or target of interest. The information sources can communicate with the central processing center via a plurality of communications links. Information produced by the sensors must be processed so that decisions can be made based on that information. This information can be processed in the command center according to predetermined algorithms to produce target decisions. When multiple sources provide information about a common target and/or a common area of interest, that information can be combined, or fused, to produce more reliable information.

Figure 2:
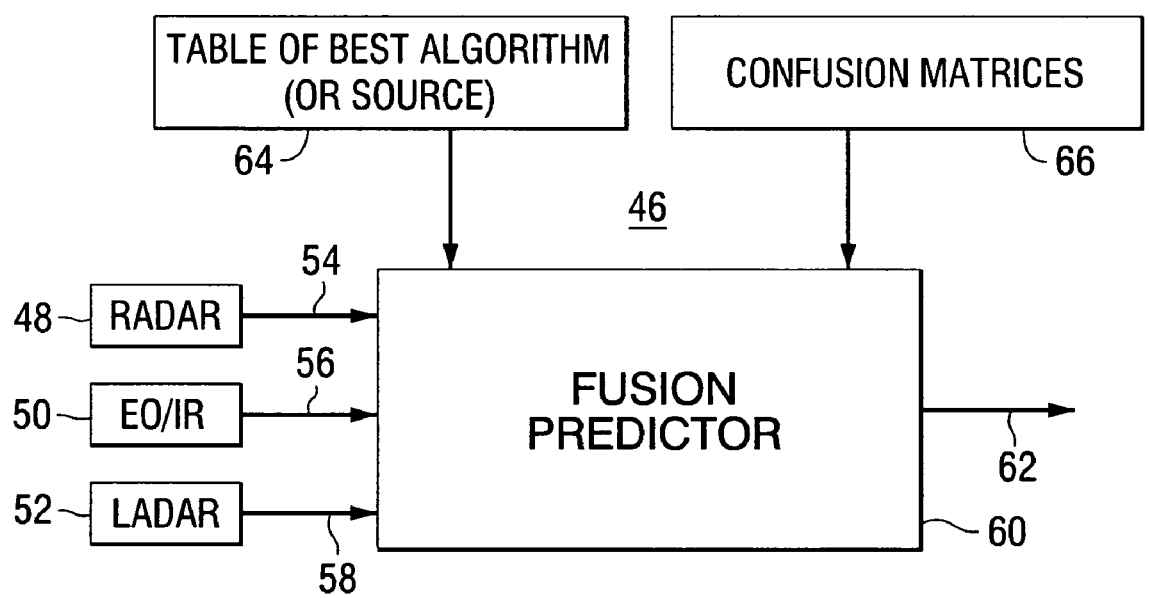
FIG. 2 is a functional block diagram of a system that includes a fusion predictor in accordance with the invention.

FIG. 2 is a functional block diagram of a system 46 that includes a fusion predictor in accordance with the invention. The system includes a plurality of sensors, which can include for example, radar 48, electro-optical and/or infrared sensors 50, and ladar 52. The sensors gather information about a possible target or area of interest and produce decisions and associated confidences in making such decisions on lines 54, 56 and 58 that are representative of decisions about the targets in an area of interest. These decisions along with the associated confidence levels are combined in a fusion predictor 60 to produce a fused output decision on line 62. The output may include, for example, an identification of a target type or some feature in the area of interest. The fusion predictor utilizes various metrics, or parameters, to process the input decisions. Such parameters can include an identified best algorithm or source 64, and one or more confusion matrices 66.

The various elements of FIG. 2 need not be physically connected, but can be positioned in separate places or on separate platforms. For example, the sensors could be mounted in a surveillance air vehicle and the fusion processor could be located in a command center as shown in FIG. 1.

Figure 3:
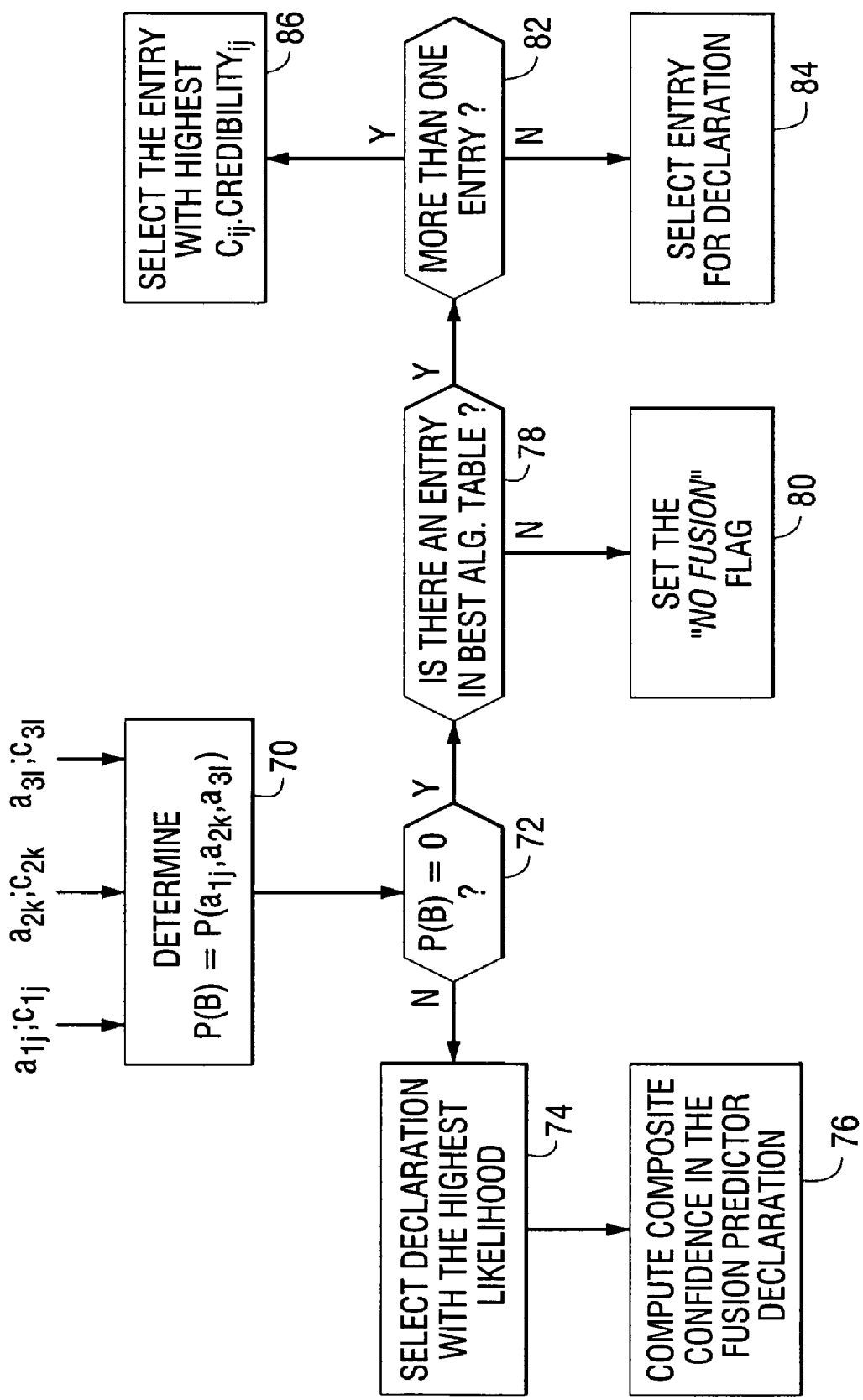
FIG. 3 is a flow diagram that illustrates the method of the invention.

FIG. 3 is a flow diagram that illustrates the method of the invention. The method fuses information from multiple inputs to produce a declaration or decision. As used herein, a declaration is a decision made along with an associated confidence level (0 to 1) that reflects the belief level in the decision made. Block 70 shows that the method starts by receiving a plurality of declarations, illustrated as $a_{1j}$; $c_{1j}$, $a_{2k}$; $c_{2k}$, and $a_{3l}$; $c_{3l}$. The a's represent decisions made by a plurality of classifiers (or sources) and the c's represent confidence levels associated with those decisions. The classifiers can be, for example, a neural network, a decision tree, a template matcher classifier, or a fuzzy logic classifier.

From these inputs, the probability of a joint set of declarations P(B) is determined, for example, either using computations or using a look-up table. For an event B, B=[T1, T3, T5, . . . ] represents a case where the first classifier makes a decision T1, the second classifier makes a decision T3, the third classifier makes a decision T5, and so on.

P(B) for each decision is then compared to zero as shown in block 72. If P(B) is not zero, the declaration with the highest likelihood for a particular event is chosen as shown in block 74 and the composite confidence in the fusion predictor declaration is computed as shown in block 76. The optimization to determine the highest likelihood declaration for a given event B can be calculated off-line using Bayes' formula as described below and then stored in a look-up table, thus the reason for calling the invention the fusion predictor. If P(B) is zero, then the method determines if there is an entry in a best algorithm table as shown in block 78.

If there is no entry in the best algorithm table, a no "fusion" flag is set as shown in block 80. If the best algorithm table has an entry, meaning the given decision source or algorithm is the best for making the declared decision about the given target as shown in Table 2, then the table is checked to determined if there are multiple algorithms as shown in block 82. Multiple entries mean more than one of the algorithms or sources are best in identifying a given target. If there are multiple algorithms in the table, then the entry with the highest credibility is selected as shown in block 84. If not, (there is only one entry), then the one listed entry is selected for the declaration as shown in block 86.

Various fusion criteria or metrics must be pre-established during a characterization stage for use in the fusion process. The characterization stage is an off-line process that is required to establish various metrics that are used to optimize the decision level fusion. In one embodiment, the fusion process uses an assurance metric, a deception metric, a Pcc metric (probability of correct classification), and a credibility metric. These metrics can be established during an algorithm training and characterization process. During the training process, a ground truth is used to generate these metrics. Ground truths are known terms used in the algorithm training. A ground truth is the truth about the target type, which is associated with collected field data or a simulated target signature.

An assurance metric is computed as an average over a number of test samples for each target and, when a decision is correct, the assurance metric indicates the difference in the confidence level for that decision and a second decision (or hypothesis) having a lower confidence level.

The deception metric is computed as an average over a number of test samples for each target and, when a decision is incorrect, the deception metric indicates the difference in the confidence level for that decision and the confidence level of the correct decision (or hypothesis).

A confusion matrix, as shown in Table 1, represents historical performance data. The confusion matrix is developed during the training and characterization process of any classifier. As shown in the first row of the confusion matrix, the probability of classifying a target T1 as T1 is 95%, and probability of classifying T1 as T4 is 5%. In other words, if there are 100 T1 targets, then 95 of targets T1 would be correctly classified as T1, and 5 targets T1 would be classified incorrectly as T4. The probabilities of correct classification, Pcc, are the diagonal elements of the confusion matrix. A credibility metric is computed for each target declaration and indicates for any given declaration, how often the declaration is correct. The credibility metric is computed using the columns of the confusion matrix.

Table 1 shows an example of the probability of estimates or declarations for targets T1 through T7.

TABLE 1

| Truth | Estimates/Declarations | | | | | | | |
|---|---|---|---|---|---|---|---|---|
| | T1 | T2 | T3 | T4 | T5 | T6 | T7 | SUM |
| T1 | 0.95 | 0 | 0 | 0.05 | 0 | 0 | 0 | 1 |
| T2 | 0.2 | 0.7 | 0 | 0.1 | 0 | 0 | 0 | 1 |
| T3 | 0.3 | 0 | 0.7 | 0 | 0 | 0 | 0 | 1 |
| T4 | 0.2 | 0.01 | 0 | 0.799 | 0 | 0 | 0 | 1 |
| T5 | 0 | 0 | 0 | 0.01 | 0.946 | 0.03 | 0 | 1 |
| T6 | 0 | 0.014 | 0 | 0 | 0 | 0.984 | 0 | 1 |
| T7 | 0 | 0 | 0.14 | 0 | 0 | 0.011 | 0.945 | 1 |

For the information in Table 1, Pcc for T1=0.95, and the credibility of a T1 declaration=(0.95/(0.95+0.2+0.3+0.2))=0.57, assuming an equal number of training samples for each target, otherwise the number of samples is used to compute the Pcc and credibility for a given target by dividing the number of correctly classified samples by the total number of samples.

In another example, the Pcc for T2=0.7, and the credibility of a T2 declaration=(0.7/0.7+0.01+0.014))=0.96.

During the training process, the ground truth is also used to generate two metrics if multiple algorithms are characterized jointly. The first metric is called a value-added metric. The value-added metric provides a percentage per target and indicates how often the decision is correct when all (or a majority) of the other classifiers are incorrect. The second metric is called a confusion metric. The confusion metric provides a percentage per target and indicates how often the decision is incorrect when all (or a majority) of the other classifiers are correct.

In one embodiment of the invention, during the training process of the decision source or classifier, ground truth data is used to: compute six metrics for each algorithm and each target; construct a table of best algorithms; and construct a confusion matrix for each algorithm. The best algorithm for declaring a given target optimizes the six metrics. A very conservative optimization is: highest assurance; lowest deception; highest Pcc; highest credibility; highest value-added; and lowest confusion. For such optimization, the table of algorithms may be very sparse or empty.

Table 2 provides an example of a best algorithm table that identifies the best algorithm to use for each target.

TABLE 2

| | Declaration | | | | |
|---|---|---|---|---|---|
| | T1 | T2 | T3 | ... | Tn |
| Source/Algorithm 1 | X | | | | |
| Source/Algorithm 2 | | | X | | |
| Source/Algorithm 3 | | X | | | |

In order to have a fair assessment among various algorithms for a given target, the same number of samples is used for performance characterization. A best algorithm can be designated for each target.

Table 3 illustrates a confusion matrix that captures the performance characterization. For example, if there are 100 T1 targets (truth), the confusion matrix shows how many would be correctly classified by the algorithm (estimates/declarations) as T1; how many would be wrongly classified as T2, ..., T7; how many instances the algorithm cannot make a decision due to ambiguity; and how many instances the algorithm would declare that the target T1 is not among a library of predefined targets. An example confusion matrix is shown in Table 3.

TABLE 3

| Truth | Estimates/Declarations | | | | | | | | |
|---|---|---|---|---|---|---|---|---|---|
| | T1 | T2 | T3 | T4 | T5 | T6 | T7 | NoDeclaration | NotInLibrary |
| T1 | | | | | | | | | |
| T2 | | | | | | | | | |
| T3 | | | | | | | | | |
| T4 | | | | | | | | | |
| T5 | | | | | | | | | |
| T6 | | | | | | | | | |
| T7 | | | | | | | | | |
| NoDeclaration | 0 | 0 | 0 | 0 | 0 | 0 | 0 | 1 | 0 |
| NotInLibrary | | | | | | | | | |

"Not-in-Library" is declared if the highest confidence coming out of the classifier is less than a first predetermined threshold. "No decision or declaration" is declared if the difference between the highest two confidences is less than a second predetermined threshold. The thresholds are input parameters. For entries in the "no decision" column, a tally of the decision pairs contributing to the "no decision" is maintained during the algorithm characterization using the supplied ground truth. For each target there is a string of confused target decisions and associated percentages.

The "no decision/declaration" row of the confusion matrix is all zeros except 1 (or the maximum count of all "no declaration" among all algorithms) under a "no declaration" column. The "not-in-library" row of the confusion matrix is constructed by presenting targets not in the library and tallying the various declarations. If one algorithm is trained on a smaller number of targets than another algorithm, then the smaller confusion matrix needs to be scaled to the largest one as shown by the following example. Table 4 represents the confusion matrix of one algorithm trained on targets T1, T2, T3, T4, and T5, while Table 5 represents the confusion matrix of another algorithm trained only on targets T1, T2, and T3.

TABLE 4

| | | Estimates | | | | | | | |
|---|---|---|---|---|---|---|---|---|---|
| | | T1 | T2 | T3 | T4 | T5 | NoDecision | NotInLibrary | SUM |
| Truth | T1 | 1 | 0 | 0 | 0 | 0 | 0 | 0 | 1 |
| | T2 | 0 | 1 | 0 | 0 | 0 | 0 | 0 | 1 |
| | T3 | 0 | 0 | 1 | 0 | 0 | 0 | 0 | 1 |
| | T4 | 0 | 0011 | 0 | 0.989 | 0 | 0 | 0 | 1 |
| | T5 | 0 | 0 | 0.011 | 0 | 0.956 | 0.033 | 0 | 1 |
| | NoDecision | 0 | 0 | 0 | 0 | 0 | 1 | 0 | 1 |
| | NotInLibrary | 0 | 0 | 0.044 | 0 | 0 | 0.011 | 0.945 | 1 |

TABLE 5

| | | Estimates | | | | | |
|---|---|---|---|---|---|---|---|
| | | T1 | T2 | T3 | NoDecision | NotInLibrary | SUM |
| Truth | T1 | 0.989 | 0 | 0 | 0.011 | 0 | 1 |
| | T2 | 0 | 0.989 | 0 | 0 | 0.011 | 1 |
| | T3 | 0 | 0 | 1 | 0 | 0 | 1 |
| | NoDecision | 0 | 0 | 0 | 1 | 0 | |
| | NotInLibrary | 0 | 0.07 | 0.03 | 0 | 0.9 | |

In this case, two rows and two columns corresponding to T4 and T5 are inserted in the confusion matrix as shown in Table 6 as NotInLibrary. Another choice is to use random declarations across the entire row for T1, T2 . . . , NotInLibrary.

TABLE 6

| | | Estimates | | | | | | | |
|---|---|---|---|---|---|---|---|---|---|
| | | T1 | T2 | T3 | T4 | T5 | NoDecision | NotInLibrary | SUM |
| Truth | T1 | 0.989 | 0 | 0 | 0 | 0 | 0 | 0 | 0.989 |
| | T2 | 0 | 0.989 | 0 | 0 | 0 | 0 | 0.011 | 1 |
| | T3 | 0 | 0 | 1 | 0 | 0 | 0 | 0 | 1 |
| | T4 | 0 | 0 | 0 | 0 | 0 | 0 | 1 | 1 |
| | T5 | 0 | 0 | 0 | 0 | 0 | 0 | 1 | 1 |
| | NoDecision | 0 | 0 | 0 | 0 | 0 | 1 | 0 | 1 |
| | NotInLibrary | 0 | 0.07 | 0.03 | 0 | 0 | 0 | 0.9 | 1 |

In one embodiment of the invention, the optimization process for the fusion predictor uses Bayes' Theorem as described below. Let $A=\{T_1, T_2, \ldots, T_n\}$ be the set of potential declarations, and let B be an arbitrary event. Then Bayes' Theorem is given by:

$$P(T_i|B) = P(B|T_i) * P(T_i)/P(B),$$

where the probability of the event B is given by $$P(B) = [P(B|T_i) * P(T_i) + \ldots + P(B|T_n) * P(T_n)] \text{ and}$$

$$P(T_i|B) = P(B|T_i) * P(T_i) / [P(B|T_i) * P(T_i) + \ldots + P(B|T_n) * P(T_n)].$$

Assume, without the loss of an generality, that there are three cooperating algorithms. Then an event can be $$B = \{a_{1j}, a_{2k}, a_{3l}\}$$

where $a_{1j}, a_{2k}$ and $a_{3l}$ are the decisions made by algorithms 1, 2 and 3 as targets Tj, Tk, Tl respectively. Then $$P(T_i|a_{1j}, a_{2k}, a_{3l}) = P(a_{1j}, a_{2k}, a_{3l}|T_i) * P(T_i) / [P(a_{1j}, a_{2k}, a_{3l}|T_i) * P(T_i) + \ldots + P(a_{1j}, a_{2k}, a_{3l}|T_n) * P(T_n)],$$

where $P(T_i)$ represents the a priori probability for target $T_i$, which may be available from the training samples (reflecting the degree of learning of a specific target).

So, if for example, there are more training samples for target 1, then $P(T_i) > P(T_j)$ for all j not equal to 1.

Also assume decision independence such that:

$$P(a_{1j}, a_{2k}, a_{3l}|T_1) = P(a_{1j}|T_1) P(a_{2k}|T_1) P(a_{3l}|T_1).$$

There are three situations to be considered when assuming independence. First, if $a_{1j}, a_{2k}$ and $a_{3l}$ are the decisions from different algorithms operating on different image types, i.e., synthetic aperture radar (SAR), forward looking infrared (FLIR), or ladar, then the independence may not be an issue due to: different sensing phenomenology and image formation, and different optimization carried out by each algorithm.

Second, if $a_{1j}, a_{2k}$ and $a_{3l}$ are the decisions from different cooperating algorithms operating on the same image type, then the independence may still not be an issue due to different optimization carried out by each algorithm.

Third, if $a_{1j}, a_{2k}$ and $a_{3l}$ are the decisions from the same type of algorithm operating on the same image type, i.e., multiple SARs taken by multiple cooperating platforms, then the issue of independence is critical.

Adequate separation among the flight members is required to ensure image or feature vector independence, such that $$P(T_i|a_{1j}, a_{2k}, a_{3l}) = P(a_{1j}|T_1) P(a_{2k}|T_1) P(a_{3l}|T_1) P(T_i) / [P(a_{1j}|T_1) P(a_{2k}|T_1) P(a_{3l}|T_1) + \ldots + P(a_{1j}|T_n) P(a_{2k}|T_n) P(a_{3l}|T_n)].$$

The above equation is calculated for all i=1, 2, ..., n and the declaration that yields the highest likelihood can be selected.

If the denominator of the equation is zero, meaning P(B)=0, i.e., the event B cannot occur. For such a case, the "table of best algorithm" will be consulted to determine if there is a best declaration entry, otherwise a "not-to-fuse" flag is set for the fusion manager, which may subsequently request that the flying platform's sensor manager acquire additional data collection or new data collection.

The confidence associated with the fusion predictor declaration is:

$$\text{Confidence} = [(c_{1j}.\text{Credibility}_{1j}) * (c_{2k}.\text{Credibility}_{2k}) * (c_{3l}.\text{Credibility}_{3l})]/[(c_{1j}.\text{Credibility}_{1j}) * (c_{2k}.\text{Credibility}_{2k}) * (c_{3l}.\text{Credibility}_{3l})] + [(1 - c_{1j}.\text{Credibility}_{1j}) * (1 - c_{2k}.\text{Credibility}_{2k}) * (1 - c_{3l}.\text{Credibility}_{3l})].$$

If the fusion predictor declares "no decision", then the Dempster-Shafer process will be invoked using the confusion matrices. For example, if all of the algorithm's declarations were also "no decision", then we intersect the sets of tallied hypotheses collected during characterization and stored as part of the confusion matrices. The intersection of two sets will determine the common declarations or decisions among the sets. If algorithms 1's declaration was Tj, and algorithms 2's "no decision", then we use Pcc of Tj (from the confusion matrix diagonal) and intersect with the "no decision" set from algorithm 2.

It should be noted that each classification algorithm or information source has its own calculation of the classification confidence level, yielding subjective measures of the classification confidence levels, which affects the performance of the fusion process. For example, a confidence level of 0.9 in classifying a specific target using a neural network classifier may be equivalent to a confidence level of 0.7 using a decision tree classifier operating on the same target features. Therefore, the fusion predictor was also implemented to map the confidence level to probability of classification. This accounts for the subjectivity of each source in calculating its confidence level. This mapping was implemented to cover some specific applications, where the commander cannot relate to the confidence level from a classifier but to the probability of successfully completing his or her mission. In some missions, the commander's objective is to acquire and identify with high probability of correct classification a specific target, in other missions, the commander's objective may be to find out the type of targets in the sensor field of view that the system can classify and prioritize with average probability of correct classification. In the surveillance type mission, the commander's objective would be to classify every object in the sensor field of view even at low probability of correct classification.

The fusion predictor uses a set of curves as shown in FIGS. 4, 5 and 6 which are derived during the training process for each classifier. There is a curve for each target that relates the confidence measure to the probability of correct classification. This curve is used to generate the corresponding row of the confusion matrix for the specific target. In this implementation, three confusion matrices are generated for each classifier during the training process corresponding to high, medium, and low confidence by choosing the confidence level for each target that yields a high, medium, or low probability of correct classification as shown in FIGS. 4, 5 and 6. In operation, the confidence level for each classifier output is checked against the three threshold values for high, medium, and low probability of correct classification, and the corresponding confusion matrix is selected for fusion.

Table 7 shows confusion matrices for high, medium and low probability of correct classification of target T1 based on FIG. 4.

TABLE 7

| | | Estimates | | | | | | |
|---|---|---|---|---|---|---|---|---|
| | Truth | T1 | T2 | T3 | T4 | T5 | T6 | NotInLibrary |
| HighPcc | T1 | 0.95 | 0.01 | 0 | 0.02 | 0 | 0.02 | 0 |
| MediumPcc | T1 | 0.8 | 0.05 | 0 | 0 | 0 | 0.05 | 0.1 |
| LowPcc | T1 | 0.4 | 0.1 | 0 | 0.25 | 0 | 0.15 | 0.1 |

Table 8 shows confusion matrices for high, medium and low probability of correct classification of target T6 based on FIG. 6.

TABLE 8

| | | Estimates | | | | | | |
|---|---|---|---|---|---|---|---|---|
| | Truth | T1 | T2 | T3 | T4 | T5 | T6 | NotInLibrary |
| HighPcc | T6 | | | None | | | | |
| Medium-Pcc | T6 | 0 | 0.05 | 0 | 0.1 | 0 | 0.85 | 0 |
| LowPcc | T6 | 0.04 | 0.1 | 0 | 0.25 | 0 | 0.51 | 0.1 |

It should be noted as shown in FIG. 6 that for some targets, there may be no confidence that yields high probability of correct classification as shown in the High Pcc confusion matrix for target T6 in Table 8. In this case, medium confidence is used, if the fusion with other sources would yield a fused confusion matrix with high confidence.

The information fusion predictor (IFP) of this invention provides optimized fusion of multi-algorithms/multi-sources to produce combat identification decisions. The fusion predictor maximizes the joint decision probability utilizing all available information about each reporting algorithm or source, such as the historical measures captured by confusion matrices, the credibility of the source reporting, the various degrees of learning associated with each target, and the corresponding figure-of-merit in each declaration. The fusion predictor effectively handles the situation where different identification algorithms or information sources may not be trained on exactly the same target set, as well as the presence of unknown targets leading to "no decision" or "not-in-library" declarations. The fusion predictor of this invention outperforms Dempster-Shafer and guarantees reliable fused decisions. The fusion predictor can provide fusion of decisions at various levels encompassing type, class, allegiance, and identification of friend/foe/neutral.

In one embodiment of the invention, algorithms are characterized by computing six performance metrics, developing confusion matrices using a characterization database (representing different instances of the target set obtained during field data collection or using physics-based modeling and simulation tools if the field data is not available), and generating a best of algorithms table. Confusion matrices for algorithms that were trained on different target set numbers are scaled. This allows for various degrees of learning for various targets. Confidences are developed for the fused declarations and "no decision" declarations are refined. The fused decision is output with an associated confidence.

The IFP optimizes the joint decision probability yielding statistically optimal performance. The IFP does not fuse the confidences. It uses the joint decision probability to predict the appropriate decision. The IFP does not use any heuristic rules. The IFP optimizes the joint decision probability, which is obtained from a detailed characterization of the contributor classifiers yielding statistically optimal performance.

The joint decision probability can be computed from multiple confusion matrices from multiple classifiers to determine an optimized assignment rule. The IFP is also applicable for fusing decisions from various sources at various levels of classifications such as type, class, friend/foe/neutral, and allegiance. The IFP accounts for the degree of learning of various classification sources for each individual target and the associated credibility of each source to determine the optimal assignment rule.

The various processes and algorithms described above can be implemented using known sensors and signal processing devices.

While the invention has been described in terms of several embodiments, it will be apparent to those skilled in the art that various changes can be made to the described embodiments without departing from the scope of the invention as set forth in the following claims.

What is claimed is:

1. A method of decision fusion comprising the steps of:
  receiving a plurality of decisions and associated confidences from a plurality of information sources;
  using a plurality of confusion matrices representing historical data to determine a probability of a joint set of the decisions;
  if the probability is not zero, then choosing the decision having a highest likelihood from the plurality of decisions;
  if the probability is zero, then selecting an algorithm to be used for choosing one of the decisions; and
  outputting the chosen decision on a computer readable medium identifying a target or a feature in an area of interest.

2. The method of claim 1, wherein the algorithm is selected from a table of best algorithms.

3. The method of claim 1, further comprising the steps of:
  determining a plurality of performance metrics for each of a plurality of algorithms; and
  construct a table of best algorithms.

4. The method of claim 3, wherein the algorithms are characterized using one or more of the performance metrics.

5. The method of claim 4, wherein the performance metrics include one or more of:
  an assurance metric; a deception metric; a probability of correct classification metric; a credibility metric; a value-added metric; and a confusion metric.

6. The method of claim 4, wherein the performance metrics are determined using ground truth data.

7. The method of claim 3, further comprising the steps of:
  constructing a confusion matrix for each algorithm; and
  using the confusion matrix to produce a fused output.

8. The method of claim 7, wherein the step of constructing a confusion matrix comprises the step of:
    training the algorithms.

9. The method of claim 7, further comprising the step of:
    scaling the confusion matrix.

10. The method of claim 1, further comprising the steps of:
    comparing the confidences to a first predetermined threshold; and
    declaring a not-in-library decision if none of the confidences exceeds the first predetermined threshold.

11. The method of claim 1, further comprising the steps of:
    comparing a difference between two of the associated confidences to a second predetermined threshold; and
    declaring no decision if the difference is less than the predetermined threshold.

12. The method of claim 1, wherein the information sources are located on a plurality of platforms.

13. The method of claim 1, wherein the decisions are based on different image types.

14. The method of claim 1, wherein the decisions are based on different algorithms operating on an image type.

15. The method of claim 1, wherein the decisions are based on multiple sensors using the same algorithm on an image type.

16. The method of claim 1, wherein the selected decision is based on an intersection of two sets of decisions in two confusion matrices.

17. The method of claim 1, further comprising the step of:
    mapping confidence levels for the decisions to probabilities of classification.

18. An apparatus comprising:
    a plurality of sensors for producing a plurality of decisions and associated confidences from a plurality of information sources;
    a processor for using a plurality of confusion matrices representing historical data to determine probabilities of joint sets of the decisions, and for outputting one of the decisions identifying a target or a feature in an area of interest;
    wherein if the probabilities are not zero, then the processor chooses the decision having a highest likelihood from the plurality of decisions; and
    if the probabilities are zero, then the processor selects an algorithm to be used for choosing one of the decisions.

* * * * *

UNITED STATES PATENT AND TRADEMARK OFFICE
CERTIFICATE OF CORRECTION

PATENT NO.       : 7,558,772 B2
APPLICATION NO.  : 11/297145
DATED            : July 7, 2009
INVENTOR(S)      : Omar Aboutalib It is certified that error appears in the above-identified patent and that said Letters Patent is hereby corrected as shown below:

Column 3, Line 1
"If there is no entry in the algorithm table, a no "fusion"..."
Should Read
"If there is no entry in the algorithm table, a "no fusion"..."

Signed and Sealed this

Twelfth Day of January, 2010

David J. Kappos
*Director of the United States Patent and Trademark Office*